(12) United States Patent
Liao et al.

(10) Patent No.: US 11,428,971 B2
(45) Date of Patent: Aug. 30, 2022

(54) LIQUID CRYSTAL MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yanping Liao, Beijing (CN); Junjie Guo, Beijing (CN); Yifu Chen, Beijing (CN); Xibin Shao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/278,803

(22) PCT Filed: Aug. 6, 2020

(86) PCT No.: PCT/CN2020/107367
§ 371 (c)(1),
(2) Date: Mar. 23, 2021

(87) PCT Pub. No.: WO2021/052051
PCT Pub. Date: Mar. 25, 2021

(65) Prior Publication Data
US 2021/0382344 A1    Dec. 9, 2021

(30) Foreign Application Priority Data

Sep. 20, 2019 (CN) .......................... 201910892658.0

(51) Int. Cl.
*G02F 1/1333* (2006.01)
*F21V 8/00* (2006.01)

(52) U.S. Cl.
CPC .... *G02F 1/133328* (2021.01); *G02F 1/13332* (2021.01); *G02F 1/133317* (2021.01); *G02B 6/0088* (2013.01)

(58) Field of Classification Search
None
See application file for complete search history.

(56) References Cited

U.S. PATENT DOCUMENTS

| 10,234,714 B2 | 3/2019 | Zhang et al. |
| 2005/0212991 A1* | 9/2005 | Sugawara ......... G02F 1/133308 349/58 |

(Continued)

FOREIGN PATENT DOCUMENTS

| CN | 1673832 | 9/2005 |
| CN | 202275236 | 6/2012 |

(Continued)

*Primary Examiner* — Richard H Kim
(74) *Attorney, Agent, or Firm* — Leason Ellis LLP

(57) ABSTRACT

A liquid crystal module and a display device are provided. The liquid crystal module includes a liquid crystal panel, a bottom frame and a first frame. The first edge of the liquid crystal panel is in an open region surrounded by the bottom plate, the first side plate and the second side plate of the bottom frame. At least one selected from a group consisting of the second edge, third edge and fourth edge of the liquid crystal panel is in an open region surrounded by the first frame body, the second frame body and the third frame body, and in a direction perpendicular to the plate surface of the liquid crystal panel, the first frame and the liquid crystal panel are movably arranged with respect to each other.

19 Claims, 6 Drawing Sheets

(56) References Cited

U.S. PATENT DOCUMENTS

| | | |
|---|---|---|
| 2013/0100372 A1 | 4/2013 | Wu et al. |
| 2014/0036195 A1 | 2/2014 | Kuo et al. |
| 2016/0170258 A1 | 6/2016 | Maruno |
| 2018/0017827 A1* | 1/2018 | Kil .................. G02B 6/0055 |
| 2019/0138127 A1* | 5/2019 | Seo ...................... H05K 5/03 |

FOREIGN PATENT DOCUMENTS

| | | |
|---|---|---|
| CN | 102778769 | 11/2012 |
| CN | 104360522 | 2/2015 |
| CN | 210514862 | 5/2020 |
| WO | 2012014601 | 2/2012 |

* cited by examiner

LIQUID CRYSTAL MODULE AND DISPLAY DEVICE

This application is a U.S. National Stage Application under 35 U.S.C. § 371 of International Patent Application No. PCT/CN2020/107367, filed Aug. 6, 2020, which claims priority to the Chinese patent application No. 201910892658.0, filed on Sep. 20, 2019, both of which are incorporated herein by reference in their entireties as part of the present application.

TECHNICAL FIELD

At least one embodiment of the present disclosure relates to a liquid crystal module and a display device.

BACKGROUND

In recent years, with the development of television industry, liquid crystal televisions have been liked by more and more users because of the characteristics such as wide color gamut, long life, ultra-thin appearance and so on. Liquid crystal televisions are mainly divided into liquid crystal televisions with a front frame and liquid crystal televisions without a front frame.

SUMMARY

Embodiments of the present disclosure provide a liquid crystal module and a display device. In the liquid crystal module, the liquid crystal panel and the first frame are movably arranged with respect to each other, so as to reduce the effect of external forces on the liquid crystal panel, avoid the deformation of the liquid crystal panel caused by extrusion, and reduce the probability of dark state light leakage phenomenon of the liquid crystal panel.

At least one embodiment of the present disclosure provides a liquid crystal module, which comprises: a liquid crystal panel, a bottom frame and a first frame. The liquid crystal panel comprises a plate surface, a first edge, a second edge opposite to the first edge, a third edge and a fourth edge, the third edge and the fourth edge are connected with the first edge and the second edge and are opposite to each other. The bottom frame comprises a bottom plate, a first side plate and a second side plate, the first side plate and the second side plate are opposite at an interval and respective at two opposite edges of the bottom plate, and the first edge of the liquid crystal panel is in an open region surrounded by the bottom plate, the first side plate and the second side plate. The first frame is on at least one selected from a group consisting of the second edge, the third edge and the fourth edge of the liquid crystal panel, the first frame comprises: a first frame body, a second frame body parallel to the first frame body, and a third frame body, the third frame connects an end of the first frame body away from a center of the liquid crystal panel and an end of the second frame body away from the center of the liquid crystal panel, at least one selected from the group consisting of the second edge, third edge and fourth edge of the liquid crystal panel is in an open region surrounded by the first frame body, the second frame body and the third frame body, and in a direction perpendicular to the plate surface of the liquid crystal panel, the first frame and the liquid crystal panel are movably arranged with respect to each other.

For example, in the liquid crystal module provided by at least one embodiment of the present disclosure, in the direction perpendicular to the plate surface of the liquid crystal panel, the first frame body and the liquid crystal panel are opposite and arranged at a first interval, in the direction perpendicular to the plate surface of the liquid crystal panel, the second frame body and the liquid crystal panel are opposite and arranged at a second interval, the first interval comprises at least one selected from a group consisting of air and a first buffer layer, and the second interval comprises at least one selected from a group consisting of air and a second buffer layer.

For example, in the liquid crystal module provided by at least one embodiment of the present disclosure, the first buffer layer is configured to be elastically compressible in the direction perpendicular to the plate surface of the liquid crystal panel, and an elastic modulus of the first buffer layer is greater than 30 Mpa and less than 100 Mpa; the second buffer layer is configured to be elastically compressible in the direction perpendicular to the plate surface of the liquid crystal panel, and an elastic modulus of the second buffer layer is greater than 30 Mpa and less than 100 Mpa.

For example, in the liquid crystal module provided by at least one embodiment of the present disclosure, the first buffer layer comprises a first compressible foam or a first single-sided adhesive tape, the second buffer layer comprises a second compressible foam or a second single-sided adhesive tape, an adhesive surface of the first single-sided adhesive tape is at a side of the first single-sided adhesive tape away from the liquid crystal panel, and an adhesive surface of the second single-sided adhesive tape is at a side of the second single-sided adhesive tape away from the liquid crystal panel.

For example, in the liquid crystal module provided by at least one embodiment of the present disclosure, a ratio of a size of the first interval in the direction perpendicular to the plate surface of the liquid crystal panel to a thickness of the liquid crystal panel ranges from 10% to 20%, and a ratio of a size of the second interval in the direction perpendicular to the plate surface of the liquid crystal panel to the thickness of the liquid crystal panel ranges from 10% to 20%.

For example, in the liquid crystal module provided by at least one embodiment of the present disclosure, the first frame is on the second edge, the third edge and the fourth edge of the liquid crystal panel, and a part of the first frame corresponding to the third edge and a part of the first frame corresponding to the fourth edge are respective at two ends of the bottom frame to constitute a rectangular frame, and the liquid crystal panel is in the rectangular frame.

For example, in the liquid crystal module provided by at least one embodiment of the present disclosure, in the direction perpendicular to the plate surface of the liquid crystal panel, the first side plate and the liquid crystal panel are opposite and arranged at a third interval, in the direction perpendicular to the plate surface of the liquid crystal panel, the second side plate and the liquid crystal panel are opposite and arranged at a fourth interval, and the third interval comprises at least one selected from a group consisting of air and a third buffer layer, and the fourth interval comprises at least one selected from a group consisting of air and a fourth buffer layer.

For example, in the liquid crystal module provided by at least one embodiment of the present disclosure, the third buffer layer is configured to be elastically compressible in the direction perpendicular to the plate surface of the liquid crystal panel, and an elastic modulus of the third buffer layer is greater than 30 Mpa and less than 100 Mpa; the fourth buffer layer is configured to be elastically compressible in the direction perpendicular to the plate surface of the liquid crystal panel, and an elastic modulus of the fourth buffer layer is greater than 30 Mpa and less than 100 Mpa.

For example, in the liquid crystal module provided by at least one embodiment of the present disclosure, the third buffer layer comprises a third compressible foam or a third single-sided adhesive tape, the fourth buffer layer comprises a fourth compressible foam or a fourth single-sided adhesive tape, an adhesive surface of the third single-sided adhesive tape is at a side of the third single-sided adhesive tape away from the liquid crystal panel, and an adhesive surface of the fourth single-sided adhesive tape is at a side of the fourth single-sided adhesive tape away from the liquid crystal panel.

For example, in the liquid crystal module provided by at least one embodiment of the present disclosure, a size of the first frame body in a direction perpendicular to the third frame body ranges from 2 mm to 3 mm, and a size of the second frame body in the direction perpendicular to the third frame body ranges from 2 mm to 3 mm.

For example, in the liquid crystal module provided by at least one embodiment of the present disclosure, the first frame and the second frame have a same size in the direction perpendicular to the third frame body.

For example, in the liquid crystal module provided by at least one embodiment of the present disclosure, a fifth interval is between the third frame body and at least one selected from the group consisting of the second edge, the third edge and the fourth edge of the liquid crystal panel, and the fifth interval comprises at least one selected from a group consisting of air and a fifth buffer layer.

For example, in the liquid crystal module provided by at least one embodiment of the present disclosure, the fifth buffer layer is configured to be elastically compressible in the direction perpendicular to the plate surface of the liquid crystal panel, and an elastic modulus of the fifth buffer layer is greater than 30 Mpa and less than 100 Mpa.

For example, in the liquid crystal module provided by at least one embodiment of the present disclosure, the first edge of the liquid crystal panel is provided with a bonding region, and the bonding region is configured to be bonded with a circuit board or a chip.

For example, in the liquid crystal module provided by at least one embodiment of the present disclosure, the liquid crystal module further comprises: a second frame connected with a surface of the second frame body away from the liquid crystal panel in the direction perpendicular to the plate surface of the liquid crystal panel, the second frame comprises: a fourth frame body; a first adhesive layer on a surface of the fourth frame body facing the second frame body; and a fifth frame body connected with an end of the fourth frame body away from the center of the liquid crystal panel, wherein a surface of the second frame body away from the liquid crystal panel is connected with a surface of the fourth frame facing the second frame body through the first adhesive layer.

For example, in the liquid crystal module provided by at least one embodiment of the present disclosure, an outer side of the third frame body away from the center of the liquid crystal panel is flush with an outer side of the fifth frame body away from the center of the liquid crystal panel, and the second frame further comprises a first protrusion portion on the surface of the fourth frame facing the second frame body; an orthographic projection of the first protrusion portion on a plane where the plate surface of the liquid crystal panel is located overlaps with an orthographic projection of the second frame body on the plane where the plate surface of the liquid crystal panel is located, an end surface of the first protrusion portion close to the second frame body is basically flush with a surface of the first adhesive layer close to the second frame body, and the first protrusion portion is at an outer side of the first adhesive layer away from the center of the liquid crystal panel.

For example, in the liquid crystal module provided by at least one embodiment of the present disclosure, the second frame further comprises a sixth frame body, the sixth frame body extends from the fifth frame along a direction close to the first frame, the sixth frame and the third frame are parallel in the direction perpendicular to the plate surface of the liquid crystal panel, a surface of the sixth frame body facing the third frame body is connected with a surface of the third frame body facing the sixth frame body through a second adhesive layer.

For example, in the liquid crystal module provided by at least one embodiment of the present disclosure, the liquid crystal module further comprises a backlight assembly which is on a side of the second side plate away from the liquid crystal panel and on a side of the fourth frame body of the second frame away from the liquid crystal panel, and has an end surface opposite to the fifth frame body, the backlight assembly comprises a light guide plate and a back plate, the light guide plate is parallel to the liquid crystal panel, and the back plate is at a side of the light guide plate away from the liquid crystal panel, the back plate comprises a plate-shaped body and an end portion, the plate-shaped body is parallel to the plate surface of the liquid crystal panel, and the end portion is perpendicular to the plate-shaped body and opposite to the end surface of the light guide plate.

At least one embodiment of the present disclosure provides a display device, which comprises the liquid crystal module according to any one of above embodiments.

For example, in the display device provided by at least one embodiment of the present disclosure, the display device comprises a television.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
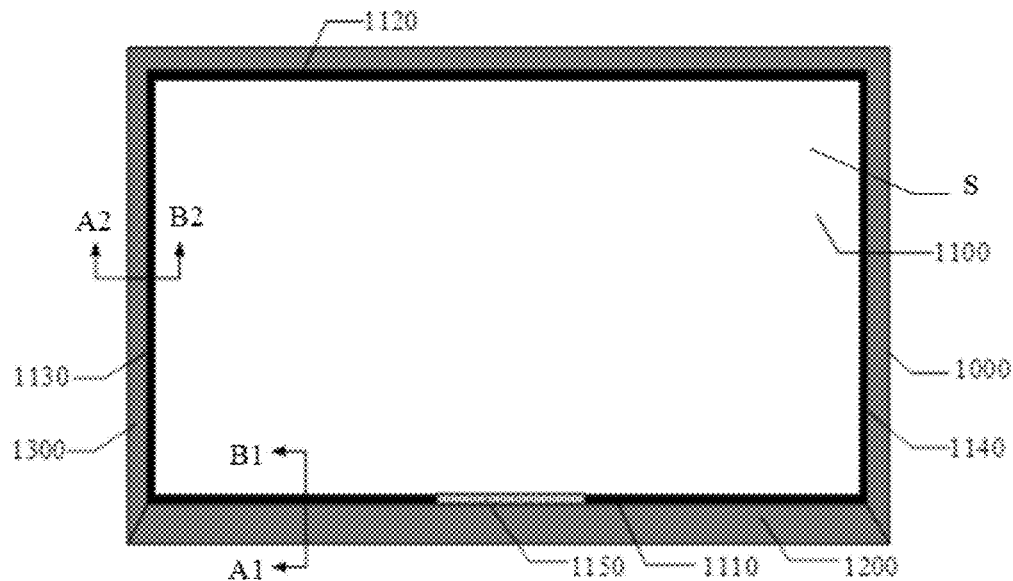
FIG. 1 is a schematic planar view of a liquid crystal module provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," "third," "fourth," "fifth" etc., which are used in the description and the claims of the present application for disclosure, are not intended to indicate any sequence, amount or importance, but distinguish various components. Also, the terms "one," "a," or "the" etc. do not mean quantity limitation, but mean that there is at least one. The terms "comprise," "comprising," "include," "including," etc., are intended to specify that the elements or the objects stated before these terms encompass the elements or the objects and equivalents thereof listed after these terms.

At present, a liquid crystal panel of a liquid crystal television is usually fixed to a middle frame of a liquid crystal module by a double-sided tape. The liquid crystal television can be installed on a wall or other suitable places through the middle frame. The display principle of the liquid crystal panel is to control light passing through liquid crystals rotating in an electric field. However, the liquid crystal panel fixed by the above fixing method is easily affected by external forces, and the liquid crystal panel and the middle frame are fixed by a double-sided adhesive tape, so there is no space for movement. Therefore, the liquid crystal panel is easily deformed by external forces, and the rotation of the liquid crystals at a position where the liquid crystal panel is deformed may also be deformed, and thus the liquid crystals cannot rotate to the normal angle, which eventually causes a dark state light leakage phenomenon of the liquid crystal panel.

In view of the above technical problem, embodiments of the present disclosure provide a liquid crystal module and a display device.

The liquid crystal module includes a liquid crystal panel, a bottom frame and a first frame. The liquid crystal panel comprises a plate surface, a first edge, a second edge opposite to the first edge, a third edge and a fourth edge, the third edge and the fourth edge are connected with the first edge and the second edge and opposite to each other. The bottom frame comprises a bottom plate, a first side plate and a second side plate, the first side plate and the second side plate are opposite at an interval and respective at two opposite edges of the bottom plate, and the first edge of the liquid crystal panel is in an open region surrounded by the bottom plate, the first side plate and the second side plate. The first frame is on at least one selected from a group consisting of the second edge, the third edge and the fourth edge of the liquid crystal panel. The first frame comprises: a first frame body, a second frame body parallel to the first frame body, and a third frame body. The third frame connects an end of the first frame body away from a center of the liquid crystal panel and an end of the second frame body away from the center of the liquid crystal panel, at least one selected from a group consisting of the second edge, third edge and fourth edge of the liquid crystal panel is in an open region surrounded by the first frame body, the second frame body and the third frame body, and in a direction perpendicular to the plate surface of the liquid crystal panel, the first frame and the liquid crystal panel are movably arranged with respect to each other. Because the liquid crystal panel of the liquid crystal module is movably arranged in the open region of the first frame, and a space for movement is arranged between the first frame and the liquid crystal panel, so that the effect of external forces on the liquid crystal panel can be reduced, the deformation of the liquid crystal panel caused by extrusion can be avoided, and the probability of dark state light leakage of the liquid crystal panel can be reduced.

In the following, the liquid crystal module and the display device provided by one or more embodiments of the present disclosure are described in detail with reference to the drawings.

Figure 2A:
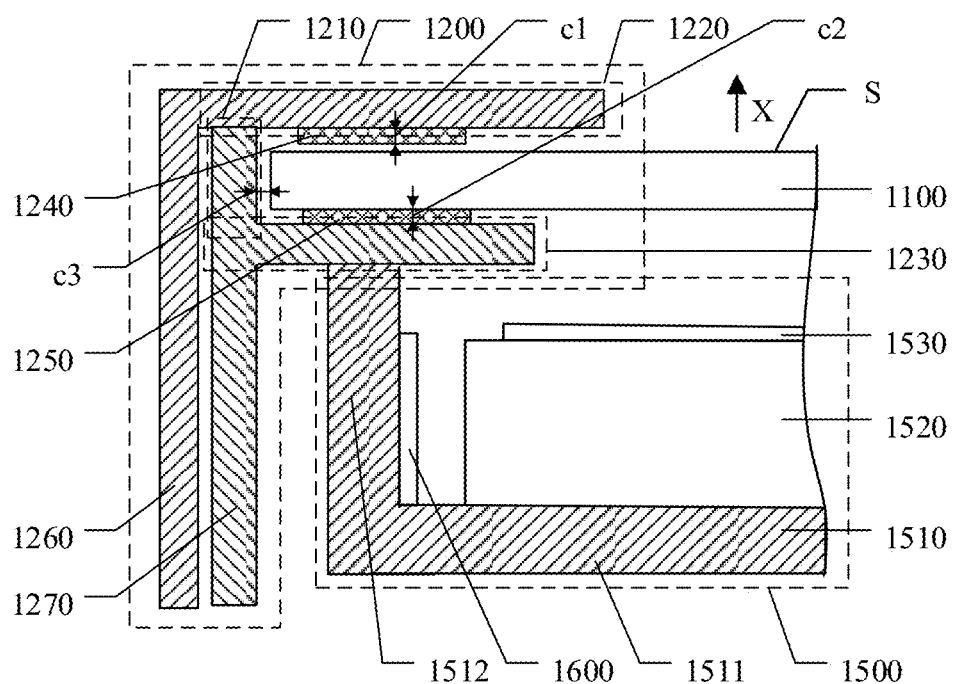
FIG. 2A is a schematic cross-sectional view of the liquid crystal module illustrated in FIG. 1 in a horizontal state taken along the line A1-B1 provided by an embodiment of the present disclosure.
Figure 3A:
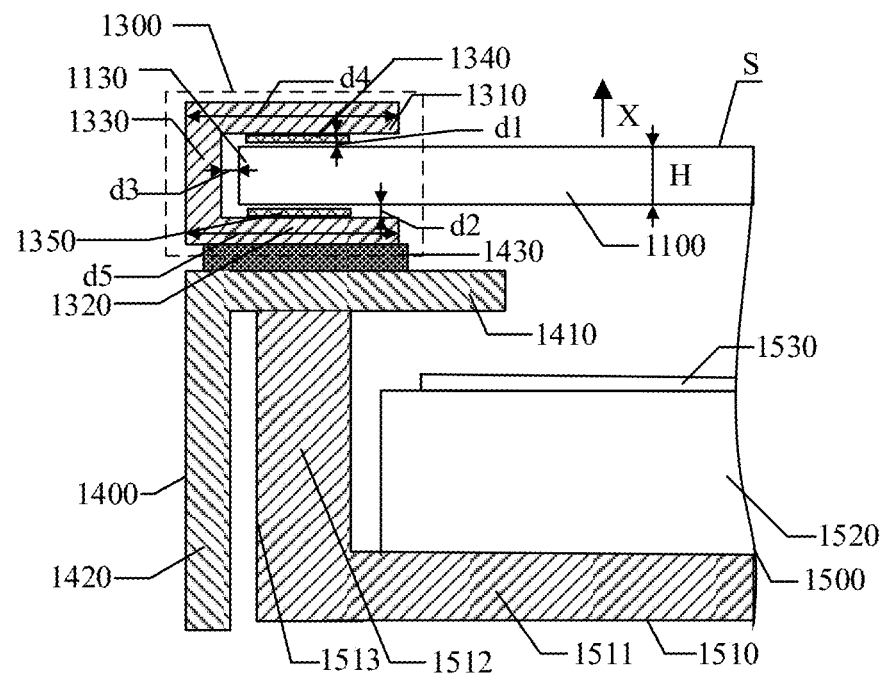
FIG. 3A is a schematic cross-sectional view of the liquid crystal module illustrated in FIG. 1 taken along the line A2-B2 provided by an embodiment of the present disclosure.
Figure 3B:
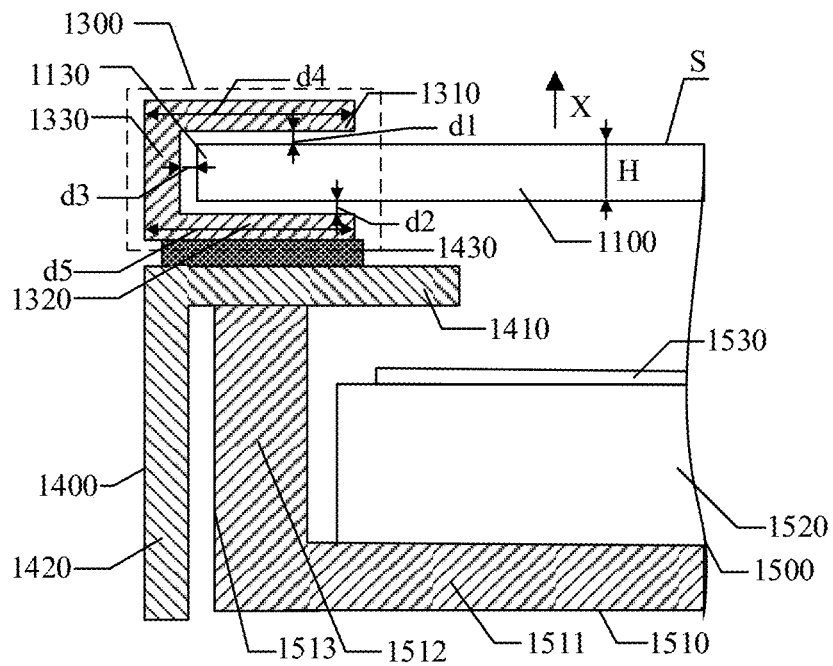
FIG. 3B is another schematic cross-sectional view of the liquid crystal module illustrated in FIG. 1 taken along the line A2-B2 provided by an embodiment of the present disclosure.

FIG. 1 is a schematic planar view of a liquid crystal module provided by an embodiment of the present disclosure. FIG. 2A is a schematic cross-sectional view of the liquid crystal module illustrated in FIG. 1 in a horizontal state taken along the line A1-B1 provided by an embodiment of the present disclosure. FIG. 3A is a schematic cross-sectional view of the liquid crystal module illustrated in FIG. 1 taken along the line A2-B2 provided by an embodiment of the present disclosure; FIG. 3B is another schematic cross-sectional view of the liquid crystal module illustrated in FIG. 1 taken along the line A2-B2 provided by an embodiment of the present disclosure.

As illustrated in FIG. 1, the liquid crystal module 1000 includes a liquid crystal panel 1100, a bottom frame 1200 and a first frame 1300. The liquid crystal panel 1100 includes a plate surface S, a first edge 1110, a second edge 1120, a third edge 1130 and a fourth edge 1140. The first edge 1110 is opposite to the second edge 1120, the third edge 1130 is opposite to the fourth edge 1140, and the third edge 1130 and the fourth edge 1140 respectively connect the first edge 1110 and the second edge 1120. The bottom frame 1200 is disposed on the first edge 1110 of the liquid crystal panel 1100.

As illustrated in FIG. 2A, the bottom frame 1200 includes a first bottom plate 1210, a first side plate 1220 and a second side plate 1230. The first side plate 1220 and the second side plate 1230 are opposite and arranged at an interval on two opposite edges of the first bottom plate 1210. The first side plate 1220 is connected with an end surface of the first bottom plate 1210 facing the first side plate 1220. The second side plate 1230 is connected with a surface of the first bottom plate 1210 facing the liquid crystal panel 1100. For example, as illustrated in FIG. 2A, the first bottom plate 1210 and the second side plate 1230 may be integrally formed. An open region is surrounded by the first bottom plate 1210, the first side plate 1220 and the second side plate 1230, and the first edge 1110 of the liquid crystal panel 1100 is in this open region. The bottom frame 1200 further includes a second bottom plate 1260 connected with the first side plate 1220 and extending in an X direction perpendicular to the plate surface S of the liquid crystal panel 1100, and includes a third bottom plate 1270 connected with the first bottom plate 1210 and extending in the X direction perpendicular to the plate surface S of the liquid crystal panel 1100. For example, the second bottom plate 1260 and the first side plate 1220 may be integrally formed; the third bottom plate 1270, the first bottom plate 1210 and the second side plate 1230 may be integrally formed.

As illustrated in FIG. 1, the first frame 1300 is disposed on at least one selected from a group consisting of the second edge 1120, the third edge 1130 and the fourth edge 1140 of the liquid crystal panel 1100. As illustrated in FIG. 3A, the first frame 1300 includes a first frame body 1310, a second frame body 1320 and a third frame body 1330. The first frame body 1310 and the second frame body 1320 extend along a direction parallel to the plate surface S of the liquid crystal panel 1100, and the first frame body 1310 is parallel and opposite to the second frame body 1320. The third frame body 1330 extends along the X direction perpendicular to the plate surface S of the liquid crystal panel 1100 and connects an end of the first frame body 1310 away from the center of the liquid crystal panel 1100 and an end of the second frame body 1320 away from the center of the liquid crystal panel 1100. An open region is surrounded by the first frame body 1310, the second frame body 1320, and the third frame body 1330, and the second edge 1120, the third edge 1130, and the fourth edge 1140 of the liquid crystal panel 1100 are in this open region.

It should be noted that in the present disclosure, the above-mentioned term "parallel" includes the case where the first frame body is completely parallel to the second frame body, and also includes the case where the first frame body is approximately parallel to the second frame body; the above-mentioned "approximately parallel" means that an included angle between the first frame body and the second frame body is less than 5 degrees.

For example, in some examples, as illustrated in FIG. 1, the first frame 1300 is arranged on the second edge 1120, the third edge 1130 and the fourth edge 1140 of the liquid crystal panel 1100, and a part of the first frame 1300 corresponding to the third edge 1130 and a part of the first frame 1300 corresponding to the fourth edge 1140 are respectively installed at two ends of the bottom frame 1200 to constitute a rectangular frame, and the liquid crystal panel 1100 is arranged in the rectangular frame. For example, in some examples, as illustrated in FIG. 3A, there may be an interval between the third edge 1130 of the liquid crystal panel and the first frame body 1310 in the X direction perpendicular to the plate surface S of the liquid crystal panel 1100 and there may be an interval between the third edge 1130 of the liquid crystal panel and the second frame body 1320 in the X direction perpendicular to the plate surface S of the liquid crystal panel 1100. Similarly, there may be an interval between the second edge 1120 of the liquid crystal panel 1100 and the first frame body 1310 or(and) the second frame body 1320 in the X direction perpendicular to the plate surface S of the liquid crystal panel 1100, and there may be an interval between the fourth edge 1140 of the liquid crystal panel 1100 and the first frame body 1310 or(and) the second frame body 1320 in the X direction perpendicular to the plate surface S of the liquid crystal panel 1100. In this way, the liquid crystal panel 1100 and the first frame 1300 can be movably arranged with respect to each other, and there is a space for movement between the first frame 1300 and the liquid crystal panel 1100, so that the effect of external forces on the liquid crystal panel can be reduced, the deformation of the liquid crystal panel caused by extrusion can be avoided, and the probability of dark state light leakage of the liquid crystal panel can be reduced.

For example, the first frame 1300 may be disposed on one selected from the group consisting of the second edge 1120, the third edge 1130 and the fourth edge 1140 of the liquid crystal panel 1100, or disposed on any combination of two selected from the group consisting of the second edge 1120, the third edge 1130 and the fourth edge 1140 of the liquid crystal panel 1100, or disposed on each selected from the group consisting of the second edge 1120, the third edge 1130 and the fourth edge 1140 of the liquid crystal panel 1100, and embodiments of the present disclosure include but are not limited to the above cases.

For example, in some examples, as illustrated in FIG. 3A, the first frame body 1310 is opposite to a front surface of the liquid crystal panel 1100, and the second frame body 1320 is opposite to a back surface of the liquid crystal panel 1100. Here, the front surface refers to a surface of the liquid crystal panel 1100 displaying images, and the back surface refers to a surface of the liquid crystal panel 1100 opposite to the front surface. The third edge 1130 of the liquid crystal panel 1100 is located in the open region surrounded by the first frame body 1310, the second frame body 1320 and the third frame body 1330. The first frame body 1310 and the liquid crystal panel 1100 are opposite and arranged at a first interval d1 in the X direction perpendicular to the plate surface S of the liquid crystal panel 1100, and the second frame body 1320 and the liquid crystal panel 1100 are opposite and arranged at a second interval d2 in the X direction perpendicular to the plate surface S of the liquid crystal panel 1100. The first interval d1 may include air and a first buffer layer 1340. The second interval d2 may include air and a second buffer layer 1350. Because the first frame body 1310 and the second frame body 1320 are not in direct contact with the liquid crystal panel 1100 and remain independent of each other, there is a space for movement between the first frame 1300 and the liquid crystal panel 1100, which can reduce the effect of external forces on the liquid crystal panel 1100, avoid the deformation of the liquid crystal panel 1100 caused by extrusion, and further reduce the probability of dark state light leakage of the liquid crystal panel 1100.

It should be noted that the structures at the third edge 1130, the second edge 1120 and the fourth edge 1140 of the liquid crystal panel 1100 may be the same. In addition, when the liquid crystal module is in use, the liquid crystal panel 1100 may contact with the first bottom plate 1210 of the bottom frame 1200, so that the bottom frame 1200 can support the liquid crystal panel 1100, thus ensuring that the first frame body 1310 and the second frame body 1320 do not directly contact with the liquid crystal panel 110 and remain independent of each other. Next, the detailed structure of the liquid crystal module will be described by taking the schematic cross-sectional view taken along the line A2-B2 at the third edge 1130 as an example.

For example, a cross-sectional view of the first frame 1300 in the X direction perpendicular to the plate surface S of the liquid crystal panel 1100 is, for example, U-shaped. The open region surrounded by the first frame body 1310, the second frame body 1320 and the third frame body 1330 is, for example, a U-shaped open region.

For example, in some examples, the second interval d2 may also include one selected from a group consisting of air and the second buffer layer 1350, and the first interval d1 may also include one selected from a group consisting of air and the first buffer layer 1340. Embodiments of the present disclosure are not limited thereto.

For example, as illustrated in FIG. 3A, the first buffer layer 1340 is disposed on a surface of the first frame body 1310 facing the liquid crystal panel 1100, and the second buffer layer 1350 is disposed on a surface of the second frame body 1320 facing the liquid crystal panel 1100. There is an air gap between the first buffer layer 1340 and the liquid crystal panel 1100, and there is an air gap between the second buffer layer 1350 and the liquid crystal panel 1100. The first buffer layer 1340 and the second buffer layer 1350 can prevent the liquid crystal panel 1100 from directly contacting the first frame body 1310 and the second frame body 1320 when the liquid crystal panel 1100 is squeezed, thereby reducing the stress on the liquid crystal panel 1100, avoiding the deformation of the liquid crystal panel 1100 caused by being squeezed, and further reducing the probability of dark state light leakage of the liquid crystal panel 1100. In addition, the first buffer layer 1340 and the second buffer layer 1350 can also play a buffering role when the liquid crystal panel 1100 contacts or collides with the first frame 1300, thereby protecting the liquid crystal panel 1100.

For example, in some examples, the liquid crystal module may be provided with only one selected from a group consisting of the first buffer layer 1340 and the second buffer layer 1350, and the embodiments of the present disclosure are not limited thereto.

For example, in some examples, as illustrated in FIG. 3A, the first buffer layer 1340 is configured to be elastically compressible in the X direction perpendicular to the plate surface S of the liquid crystal panel 1100, and an elastic modulus of the first buffer layer 1340 is greater than 30 Mpa and less than 100 Mpa. The second buffer layer 1350 is configured to be elastically compressible in the X direction perpendicular to the plate surface of the liquid crystal panel 1100, and an elastic modulus of the second buffer layer 1350 is greater than 30 Mpa and less than 100 Mpa. Therefore, when the liquid crystal panel 1100 is squeezed, because of the buffering effect of the first buffer layer 1340 and the second buffer layer 1350, the liquid crystal panel 1100 can be subjected to a small force, and the deformation due to squeezing is avoided, thereby reducing the probability of dark state light leakage of the liquid crystal panel 1100.

For example, in some examples, the first buffer layer 1340 and the second buffer layer 1350 may also adopt other compressible materials with an elastic modulus greater than 30 Mpa and less than 100 Mpa, such as soft plastics, which are respectively arranged in the first interval d1 and the second interval d2. Embodiments of the present disclosure are not limited thereto.

For example, in some examples, the first buffer layer 1340 may include a first compressible foam or a first single-sided adhesive tape, and the second buffer layer 1350 may include a second compressible foam or a second single-sided adhesive tape. The first single-sided adhesive tape is attached on a surface of the first frame 1310 facing the liquid crystal panel 1100, and the second single-sided adhesive tape is attached on a surface of the second frame 1320 facing the liquid crystal panel 1100. Alternatively, the first compressible foam is disposed on the surface of the first frame body 1310 facing the liquid crystal panel 1100, and the second compressible foam is disposed on the surface of the second frame body 1320 facing the liquid crystal panel 1100. In this case, the adhesive surface of the first single-sided adhesive tape is located on a side of the first single-sided adhesive tape away from the liquid crystal panel 1100, and the adhesive surface of the second single-sided adhesive tape is located on a side of the second single-sided adhesive tape away from the liquid crystal panel 1100. In this way, the first frame body 1310 and the second frame body 1320 can be independent of each other, and when the liquid crystal panel 1100 is squeezed, the stress on the liquid crystal panel 1100 can be reduced, and the probability of dark state light leakage of the liquid crystal panel 1100 can be reduced.

For example, in some examples, as illustrated in FIG. 3B, the first interval d1 between the first frame body 1310 and the liquid crystal panel 1100 may also include air. The second interval d2 between the second frame body 1320 and the liquid crystal panel 1100 may also include air. Because there is an air gap between the first frame 1300 and the liquid crystal panel 1100, the first frame 1300 and the liquid crystal panel 1100 are independent of each other, thus there is a space for movement between the first frame 1300 and the liquid crystal panel 1100, which can reduce the effect of external forces on the liquid crystal panel 1100, avoid deformation caused by being squeezed, and further reduce the probability of dark state light leakage of the liquid crystal panel 1100.

For example, in some examples, there is a fifth interval between at least one selected from the group consisting of the second edge 1120, the third edge 1130 and the fourth edge 1140 of the liquid crystal panel 1100 and the third frame body 1330. That is, in the case where the first frame 1300 is disposed on at least one selected from the group consisting of the second edge 1120, the third edge 1130 and the fourth edge 1140, the above-mentioned fifth interval is between the third frame body 1330 of the first frame 1300 and the edge of the liquid crystal panel 1100 where the first frame is disposed (for example, the second edge 1120, the third edge 1130 or the fourth edge 1140); in the case where the first frame 1300 is disposed on at least two selected from the group consisting of the second edge 1120, the third edge 1130, and the fourth edge 1140, the above-mentioned fifth interval is between the third frame body 1330 of the first frame 1300 and the two edges or three edges of the liquid crystal panel 1100 where the first frame 1300 is disposed. As illustrated in FIG. 3A and FIG. 3B, a fifth interval d3 is between the third frame body 1330 and the liquid crystal panel 1100 in the X direction perpendicular to the third frame body 1330 and parallel to the plate surface S of the liquid crystal panel 1100. The fifth interval d3 may be an air gap. There are air gaps respectively between the second edge 1120 of the liquid crystal panel 1100 and the third frame body 1330, between the third edge 1130 of the liquid crystal panel 1100 and the third frame body 1330, and between the fourth edge 1140 of the liquid crystal panel 1100 and the third frame body 1330, so that the liquid crystal panel 1100 does not directly contact the third frame body 1330 in the direction perpendicular to the third frame body 1330. In this case, the liquid crystal panel 1100 and the third frame body 1330 can be kept independent of each other, and the edge of the liquid crystal panel 1100 has a space for movement in the direction perpendicular to the third frame body 1330, so that the effect of external forces on the liquid crystal panel 1100 can be reduced, and deformation caused by being squeezed can be avoided, and the probability of dark state light leakage of the liquid crystal panel 1100 can be reduced.

For example, in some examples, the first frame 1300 is manufactured in an integral forming manner. Of course, the embodiments of the present disclosure include but are not limited to this, and the first frame 1300 may also adopt other manufacturing processes to obtain the structures illustrated in FIG. 3A and FIG. 3B.

For example, in some examples, as illustrated in FIG. 3A and FIG. 3B, a ratio of a size of the first interval d1 in the X direction perpendicular to the plate surface S of the liquid crystal panel 1100 to a thickness H of the liquid crystal panel 1100 ranges from 10% to 20%, for example, the ratio of the size of the first interval d1 in the X direction perpendicular to the plate surface S of the liquid crystal panel 1100 to the thickness H of the liquid crystal panel 1100 is 15%. A ratio of the size of the second interval d2 in the X direction perpendicular to the plate surface S of the liquid crystal panel 1100 to the thickness H of the liquid crystal panel 1100 also ranges from 10% to 20%, for example, the ratio of the size of the second interval d2 in the X direction perpendicular to the plate surface S of the liquid crystal panel 1100 to the thickness H of the liquid crystal panel 1100 is 15%.

It should be noted that, in the embodiments of the present disclosure, the thickness H of the liquid crystal panel 1100 is the size of the liquid crystal panel 1100 in the X direction perpendicular to the plate surface S of the liquid crystal panel 1100.

For example, the size of the first interval d1 in the X direction perpendicular to the plate surface S of the liquid crystal panel 1100 ranges from 0.2 mm to 0.3 mm, and the size of the second interval d2 in the X direction perpendicular to the plate surface S of the liquid crystal panel 1100 ranges from 0.2 mm to 0.3 mm The size range of the first interval d1 within 0.2 mm to 0.3 mm and the size range of the second interval d2 within 0.2 mm to 0.3 mm can reduce the effect of external forces on the liquid crystal panel 1100, so that the liquid crystal panel 1100 does not jump out of the first frame 1300.

For example, as illustrated in FIG. 3A and FIG. 3B, taking a 65-inch liquid crystal panel 1100 as an example, a distance from a display region to an edge of the liquid crystal panel 1100 may be 6 mm, a size range of the first frame body 1310 in the direction perpendicular to the third frame body 1330, that is, a size range of a width d4 of the first frame body 1310 may be 2 mm to 3 mm, and a size range of the second frame body 1320 in the direction perpendicular to the third frame body 1330, that is, a size range of a width d5 of the second frame body 1320 may be 2 mm to 3 mm Selection of the size range of the first frame body 1310 and the size range of the second frame body 1320 can ensure that the edge of the liquid crystal panel 1100 does not jump out of the open region surrounded by the first frame body 1310, the second frame body 1320 and the third frame body 1330. In addition, the size range of the width d4 of the first frame body 1310 and the size range of the width d5 of the second frame body 1320 are related to the distance from the display region to the edge of the liquid crystal panel 1100. The width of the first frame body 1310 and the width of the second frame body 1320 are required to be smaller than the distance from the display region (e.g., the normal display region of the liquid crystal panel 1100) to the edge of the liquid crystal panel 1100, so as to ensure that the liquid crystal panel 1100 does not jump out of the first frame 1300.

For example, in some examples, the width of the first frame body 1310 and the width of the second frame body 1320 in the direction perpendicular to the third frame body 1330 are equal in size, that is, the width d4 of the first frame body 1310 and the width d5 of the second frame body 1320 are equal in size. The feature "widths equal in size" includes the case where the sizes of the widths are substantially equal. The first frame body 1310 and the second frame body 1320 can ensure that the liquid crystal panel 1100 does not jump out of the first frame 1300.

For example, in some examples, the width of the first frame body 1310 and the width of the second frame body 1320 in the direction perpendicular to the third frame body 1330 may not be equal, as long as it is ensured that the liquid crystal panel does not jump out of the first frame 1300, and the embodiments of the present disclosure are not limited thereto.

In some examples, as illustrated in FIG. 3A and FIG. 3B, the liquid crystal module further includes a second frame 1400. The second frame 1400 is connected with a surface of the second frame body 1320 away from the liquid crystal panel 1100 in the X direction perpendicular to the plate surface S of the liquid crystal panel 1100. For example, the above connection mode may be bolt connection, hinge connection, clamping connection, bonding connection, etc.

In some examples, as illustrated in FIG. 3A and FIG. 3B, the second frame 1400 includes a fourth frame body 1410, a first adhesive layer 1430, and a fifth frame body 1420. The fifth frame body 1420 is connected with an end of the fourth frame body 1410 away from the center of the liquid crystal panel 1100, and a surface of the second frame body 1320 away from the liquid crystal panel 1100 is connected with a surface of the fourth frame body 1410 facing the second frame body 1320 through the first adhesive layer 1430. For example, the second frame 1400 may be a rectangular frame corresponding to the rectangular frame constituted by the first frame 1300 and the bottom frame 1200.

In some examples, as illustrated in FIG. 3A and FIG. 3B, an outer side of the third frame body 1330 away from the center of the liquid crystal panel 1100 is flush with an outer side of the fifth frame body 1420 away from the center of the liquid crystal panel 1100, so that the structure composed of the first frame 1300 and the second frame 1400 is neat and beautiful. The second frame 1400 and the first frame 1300 are connected by the first adhesive layer 1430. For example, the first adhesive layer 1430 may be a double-sided adhesive tape. The first adhesive layer 1430 is disposed between the surface of the fourth frame body 1410 facing the second frame body 1320 and the surface of the second frame body 1320 away from the liquid crystal panel 1100. In a process of assembling the liquid crystal module, the liquid crystal module may be assembled through the second frame 1400. Because the edge of the liquid crystal panel 1100 is arranged in the first frame 1300, the liquid crystal panel is prevented from suffering from a force during the assembling process.

Figure 2B:
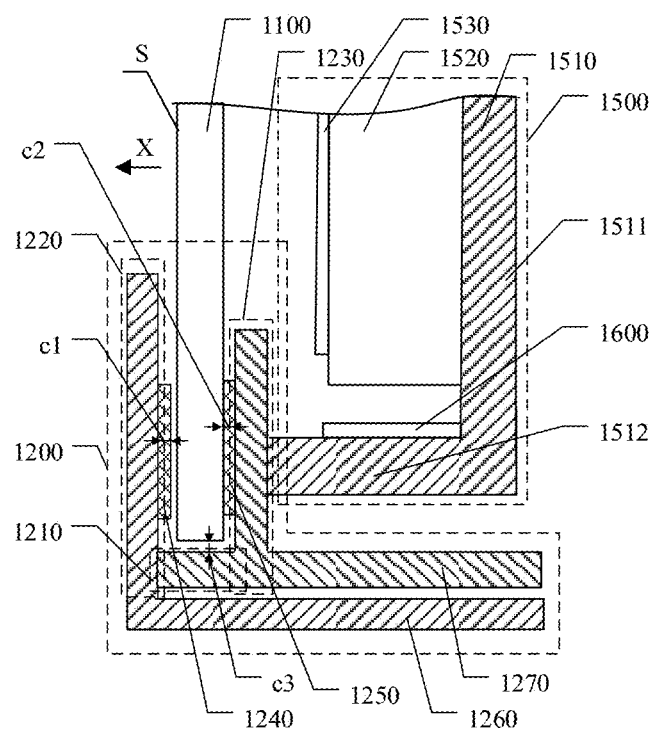
FIG. 2B is a schematic cross-sectional view of the liquid crystal module illustrated in FIG. 1 in a vertical state taken along the line A1-B1 provided by an embodiment of the present disclosure.

For example, in some examples, as illustrated in FIG. 3A and FIG. 3B, the liquid crystal module 1000 further includes a backlight assembly 1500. The backlight assembly 1500 is disposed on a side of the fourth frame body 1410 of the second frame 1400 away from the liquid crystal panel 1100 and connected with the second frame 1400. The backlight assembly 1500 includes a back plate 1510, a light guide plate 1520 disposed on the back plate 1510, and an optical film 1530 on the light guide plate 1520. The back plate 1510 includes an end portion 1512 and a plate-shaped body 1511, and the end portion 1512 is perpendicular to the plate-shaped body 1511. An end surface 1513 of the end portion 1512 of the back plate 1510 is opposite to the fifth frame body 1420, and connects the end portion 1512 with the fourth frame body 1410. The above connection mode may be, for example, bolt connection, hinge connection, clamping connection, bonding connection, etc. The backlight assembly 1500 inputs an optical signal into the liquid crystal panel 1100 to ensure the normal display of images on the liquid crystal panel 1100. FIG. 2B is a schematic cross-sectional view of the liquid crystal panel illustrated in FIG. 1 in a vertical state taken along the line A2-B2. It should be noted that the horizontal state refers to a state in which the plate surface S of the liquid crystal panel 1100 is parallel to the ground, and the vertical state refers to a state in which the plate surface S of the liquid crystal panel 1100 is perpendicular to the ground and the first edge 1110 of the liquid crystal panel 1100 is located below.

For example, in some examples, the fourth frame body 1410 of the second frame 1400 is integrally formed with the second side plate 1230 of the bottom frame 1200.

For example, in some examples, as illustrated in FIG. 2A, the first side plate 1220 is connected with the end portion of the first bottom plate 1210. The connection mode between the first side plate 1220 and the first bottom plate 1210 may be, for example, bolt connection, hinge connection, clamping connection, bonding connection, etc. The first side plate 1220 and the front surface of the liquid crystal panel 1100 are opposite and are arranged at an interval, the second side plate 1230 and the back surface of the liquid crystal panel 1100 are opposite and are arranged at an interval, and the first bottom plate 1210 and the first edge 1110 of the liquid crystal panel 1100 are opposite and are arranged at an interval. The first edge 1110 of the liquid crystal panel 1100 is located in the open region surrounded by the first bottom plate 1210, the first side plate 1220 and the second side plate 1230. The first edge 1110 of the liquid crystal panel 1100 is movably arranged in the bottom frame 1200, which reduces the stress on the liquid crystal panel 1100 and the probability of dark state light leakage.

As illustrated in FIG. 2A and FIG. 2B, there is a third interval c1 between the first side plate 1220 and the liquid crystal panel 1100 in the X direction perpendicular to the plate surface S of the liquid crystal panel 1100, and there is a fourth interval c2 between the second side plate 1230 and the liquid crystal panel 1100 in the X direction perpendicular to the plate surface S of the liquid crystal panel 1100. There is a sixth interval c3 between the first bottom plate 1210 and the liquid crystal panel 1100. The third interval c1 and the fourth interval c2 prevent the liquid crystal panel 1100 from being in direct contact with the bottom frame 1200, thus reducing the effect generated by external forces on the liquid crystal panel 1100, preventing the liquid crystal panel 1100 from being squeezed and deformed, thereby reducing the probability of dark state light leakage of the liquid crystal panel 1100.

For example, in some examples, a size range of the sixth interval c3 in the X direction perpendicular to the plate surface S of the liquid crystal panel 1100 is about 0.05 mm to 0.15 mm, for example, 0.1 mm Here, "about" means that the variation range of the numerical value is within ±5%.

As illustrated in FIG. 2A and FIG. 2B, the third interval c1 may include air and a third buffer layer 1240, and the fourth interval c2 includes air and a fourth buffer layer 1250. A third buffer layer 1240 is disposed in the third interval c1, and a fourth buffer layer 1250 is disposed in the fourth interval c2. When the liquid crystal module is in the horizontal state, as illustrated in FIG. 2A, there is no air gap between the third buffer layer 1240 and the liquid crystal panel 1100, and there is an air gap between the fourth buffer layer 1250 and the liquid crystal panel 1100. The liquid crystal panel 1100 is in contact with the third buffer layer 1240, so as to avoided the direct contact between the liquid crystal panel 1100 and the second side plate 1230, thereby reducing the stress on the liquid crystal panel 1100.

For example, in some examples, the third buffer layer 1240 in the third interval c1 and the fourth buffer layer 1250 in the fourth interval c2 may not be disposed at the same time. Embodiments of the present disclosure are not limited thereto.

As illustrated in FIG. 2B, when the liquid crystal module is in the vertical state, the sixth interval c3 between the liquid crystal panel 1100 and the first bottom plate 1210 does not exist, but a small air gap exists between the third buffer layer 1240 and the liquid crystal panel 1100, for example, the size of the small air gap is less than 0.1 mm. The first bottom plate 1210 abuts against the liquid crystal panel 1100 to ensure that the liquid crystal panel 1100 is stably arranged in the first frame 1300 and the bottom frame 1200 and cannot jump out of the first frame 1300 and the bottom frame 1200.

For example, in some examples, the third buffer layer 1240 is configured to be elastically compressible in the X direction perpendicular to the plate surface of the liquid crystal panel 1100, and an elastic modulus of the third buffer layer 1240 is greater than 30 Mpa and less than 100 Mpa. The fourth buffer layer 1250 is configured to be elastically compressible in the X direction perpendicular to the plate surface of the liquid crystal panel 1100, and an elastic modulus of the fourth buffer layer 1250 is greater than 30 Mpa and less than 100 Mpa. The above design of the third buffer layer 1240 and the fourth buffer layer 1250 can reduce the forces acting on the liquid crystal panel 1100, thereby avoiding the occurrence of dark state light leakage of the liquid crystal panel 1100.

For example, in some examples, the third buffer layer 1240 may include a third compressible foam or a third single-sided adhesive tape, and the fourth buffer layer 1250 may include a fourth compressible foam or a fourth single-sided adhesive tape. The adhesive surface of the third single-sided adhesive tape is located on a side of the third single-sided adhesive tape away from the liquid crystal display panel 1100, and the adhesive surface of the fourth single-sided adhesive tape is located on a side of the fourth single-sided adhesive tape away from the liquid crystal display panel 1100. The third single-sided adhesive tape is attached to a surface of the first side plate 1220 opposite to the front surface of the liquid crystal panel 1100. The fourth single-sided adhesive tape is attached to a surface of the second side plate 1230 opposite to the back surface of the liquid crystal panel 1100. Or, the third compressible foam is disposed on the surface of the first side plate 1220 opposite to the front surface of the liquid crystal panel 1100, and the fourth compressible foam is disposed on the surface of the second side plate 1230 opposite to the back surface of the liquid crystal panel 1100. Based on the above scheme, there is an interval between the front surface of the liquid crystal panel 1100 and the third single-sided adhesive tape, and there is an interval between the back surface of the liquid crystal panel 1100 and the fourth single-sided adhesive tape, so that the liquid crystal panel 1100 cannot directly collide with the first side plate 1220 and the second side plate 1230. In addition, the elastic modulus of the compressible foam or the elastic modulus of the single-sided adhesive tape are both greater than 30 Mpa and less than 100 Mpa, and when the liquid crystal panel 1100 is in direct contact with the compressible foam or the single-sided adhesive tape, the compressible foam or the single-sided adhesive tape can play a buffering role and reduce the stress on the liquid crystal panel 1100. Therefore, the above design scheme can reduce the stress on the liquid crystal panel 1100 and avoid the dark state light leakage phenomenon of the liquid crystal panel 1100.

For example, in some examples, the third buffer layer 1240 and the fourth buffer layer 1250 may adopt other compressible materials with an elastic modulus greater than 30 Mpa and less than 100 Mpa, such as soft plastics, which are respectively disposed in the third interval c1 and the fourth interval c2. Embodiments of the present disclosure are not limited thereto.

As illustrated in FIG. 2A and FIG. 2B, the backlight assembly 1500 is disposed on a side of the second side plate 1230 away from the liquid crystal panel 1100, and the end portion 1512 of the backlight assembly 1500 is connected with the second side plate 1230. The connection mode, for example, may be bolt connection, hinge connection, clamping connection, bonding connection, etc. A light bar 1600 is mounted on a surface of the end portion 1512 of the backlight assembly 1500 facing the light guide plate 1520 to generate an optical signal.

Specifically, the first frame body 1310 of the first frame 1300 is connected with a first side of the bottom frame 1200, and the connection mode may adopt, for example, clamping connection, bonding connection, etc.

Figure 4:
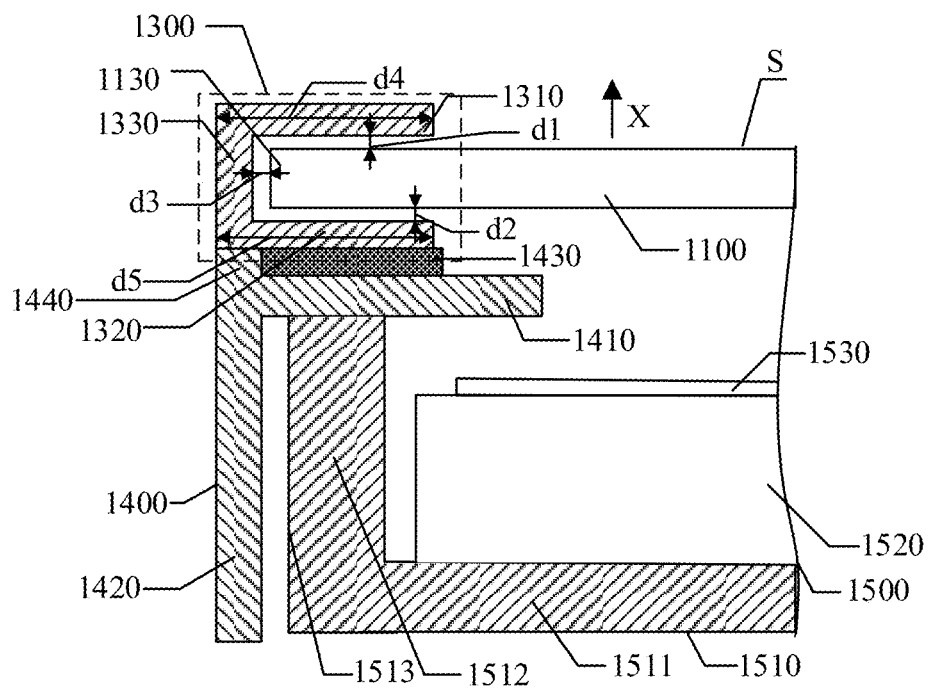
FIG. 4 is a schematic cross-sectional view of the liquid crystal module illustrated in FIG. 1 taken along the line A2-B2 provided by another embodiment of the present disclosure.

FIG. 4 is a schematic cross-sectional view of the liquid crystal module illustrated in FIG. 1 taken along the line A2-B2 provided by another embodiment of the present disclosure. As illustrated in FIG. 4, the second frame 1400 further includes a first protrusion portion 1440 provided on the surface of the fourth frame body 1410 facing the second frame body 1320. An end surface of the first protrusion portion 1440 away from the fourth frame body 1410 is opposite to the second frame body 1320, and an orthographic projection of the first protrusion portion 1440 on a plane where the plate surface of the liquid crystal panel 1100 is located overlaps with an orthographic projection of the second frame body 1320 on the plane where the plate surface S of the liquid crystal panel 1100 is located. An outer side of the first protrusion portion 1440 away from the center of the liquid crystal panel 1100 may be flush with an outer side of the fifth frame body 1420 away from the center of the liquid crystal panel 1100, so that the structure of the second frame 1400 is neat and beautiful. An end surface of the first protrusion portion 1440 close to the second frame body 1320 is substantially flush with a surface of the first adhesive layer 1430 close to the second frame body 1320, and the first protrusion portion 1440 is at an outer side of the first adhesive layer 1430 away from the center of the liquid crystal panel 1100. In this case, the first protrusion portion 1440 and the second frame body 1320 can accommodate the first adhesive layer 1430, for example, accommodate an adhesive tape, etc., so as to provide a support function of the second frame 1400 for the first frame 1300.

It should be noted that the above-mentioned term "substantially flush with" means that a height difference between the first protrusion portion 1440 and the first adhesive layer 1430 in the X direction perpendicular to the plate surface of the liquid crystal panel is not more than 0.1 mm. The first protrusion portion 1440 can accommodate the first adhesive layer 1430, for example, accommodate an adhesive tape, etc., so as to provide a support function of the second frame 1400 for the first frame 1300.

For example, in some examples, the outer side of the first protrusion portion 1440 may not be flush with the outer side of the fifth frame body 1420. Embodiments of the present disclosure are not limited thereto.

Figure 5:
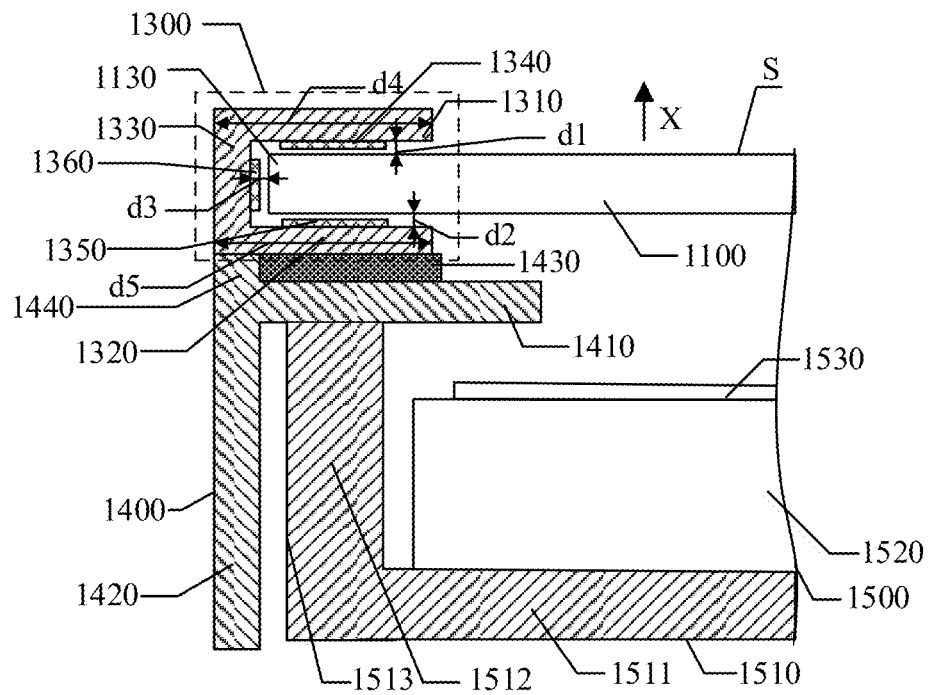
FIG. 5 is a schematic cross-sectional view of the liquid crystal module illustrated in FIG. 1 taken along the line A2-B2 provided by further another embodiment of the present disclosure.

For example, in some examples, as illustrated in FIG. 5, the fifth interval d3 includes air and a fifth buffer layer 1360. The fifth buffer layer 1360 is disposed on a surface of the third frame body 1330 facing the liquid crystal panel 1100. There is an interval between the fifth buffer layer 1360 and the liquid crystal panel 1100. The fifth buffer layer 1360 can prevent the liquid crystal panel 1100 from directly contacting the third frame body 1330 when the liquid crystal panel 1100 is squeezed, thereby reducing the stress on the liquid crystal panel 1100.

For example, in some examples, the fifth interval d3 may include one selected from a group consisting of air and the fifth buffer layer 1360. Embodiments of the present disclosure are not limited thereto.

For example, in some examples, a combination of any two selected from a group consisting of the first buffer layer 1340, the second buffer layer 1350 and the fifth buffer layer 1360 may be provided, and embodiments of the present disclosure are not limited thereto.

For example, in some examples, as illustrated in FIG. 5, the fifth buffer layer 1360 is configured to be elastically compressible in the X direction perpendicular to the plate surface of the liquid crystal panel 1100, and an elastic modulus of the fifth buffer layer 1360 is greater than 30 Mpa and less than 100 Mpa. The above design of the first buffer layer 1340, the second buffer layer 1350 and the fifth buffer layer 1360 can reduce the force acting on the liquid crystal panel 1100, thereby avoiding the occurrence of dark state light leakage of the liquid crystal panel 1100.

For example, in some examples, the fifth buffer layer 1360 includes a fifth compressible foam or a fifth single-sided adhesive tape. The fifth single-sided adhesive tape is attached to the surface of the third frame body 1330 facing the liquid crystal panel 1100, or the fifth compressible foam is disposed on the surface of the third frame body 1330 facing the liquid crystal panel 1100. In addition, the elastic modulus of the compressible foam or the elastic modulus of the single-sided adhesive tape are both greater than 30 Mpa and less than 100 Mpa, thus when the liquid crystal panel 1100 is in direct contact with the compressible foam or the single-sided adhesive tape, the compressible foam or the single-sided adhesive tape can play a buffering role and reduce the stress on the liquid crystal panel 1100. Therefore, the above design scheme can reduce the stress on the liquid crystal panel 1100 and avoid the dark state light leakage phenomenon of the liquid crystal panel 1100.

For example, in some examples, the fifth buffer layer 1360 may also adopt other compressible materials with an elastic modulus greater than 30 Mpa and less than 100 Mpa, such as a soft plastic, which is disposed in the fifth interval d3. Embodiments of the present disclosure are not limited thereto.

Figure 6:
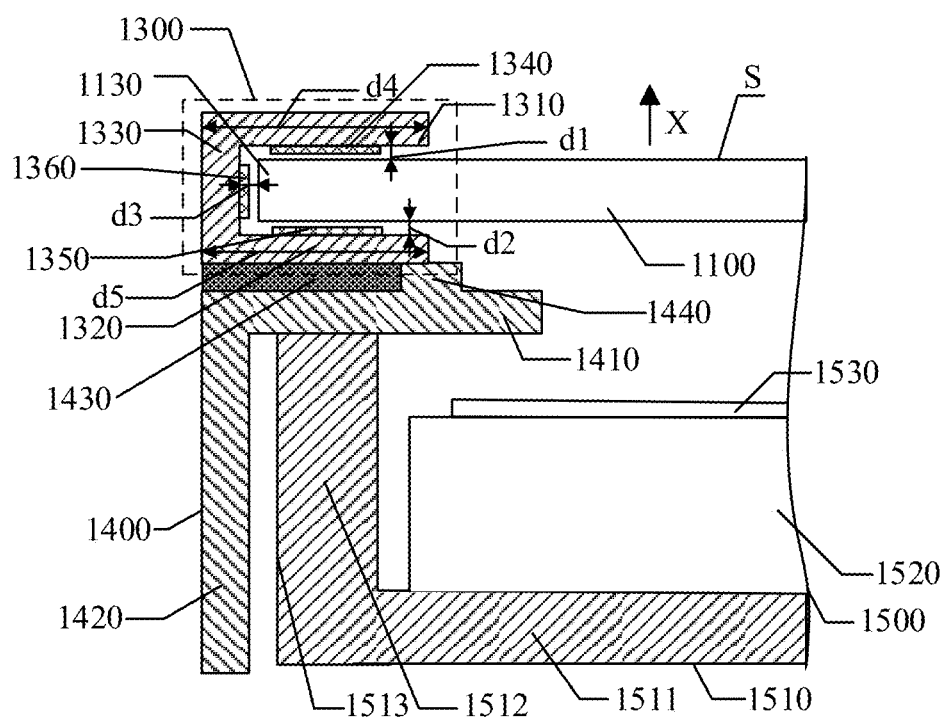
FIG. 6 is a schematic cross-sectional view of the liquid crystal module illustrated in FIG. 1 taken along the line A2-B2 provided by still another embodiment of the present disclosure.

In the liquid crystal module provided by an embodiment of the present disclosure, as illustrated in FIG. 6, the first protrusion portion 1440 of the second frame 1400 of the liquid crystal module 1000 is different in position from the first protrusion portion 1440 of the liquid crystal module 1000 illustrated in FIG. 5. The first protrusion portion 1440 of the liquid crystal module 1000 illustrated in FIG. 6 is at an inner side of the first adhesive layer 1430 close to the center of the liquid crystal panel 1100. The first protrusion portion 1440 and the first adhesive layer 1430 have substantially flush surfaces.

Figure 7:
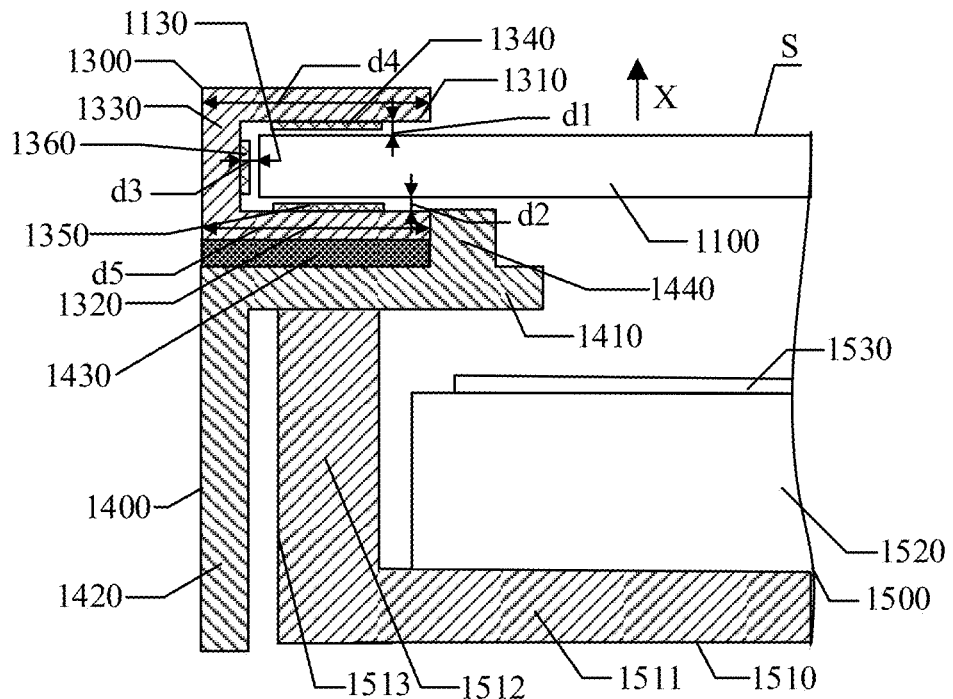
FIG. 7 is a schematic cross-sectional view of the liquid crystal module illustrated in FIG. 1 taken along the line A2-B2 provided by still another embodiment of the present disclosure.

In the liquid crystal module provided by at least one embodiment of the present disclosure, as illustrated in FIG. 7, a surface of the first protrusion portion 1440 facing the second frame body 1320 is opposite to a surface of the second frame body 1320 close to the liquid crystal panel 1100. That is, the first protrusion portion 1440 abuts against the second frame body 1320. The surface of the first protrusion portion 1440 is higher than the surface of the first adhesive layer 1430, as illustrated in FIG. 7. The first protrusion portion 1440 can accommodate the first adhesive layer 1430, for example, accommodate an adhesive tape, etc., so as to provide a support function of the second frame 1400 for the first frame 1300.

Figure 8:
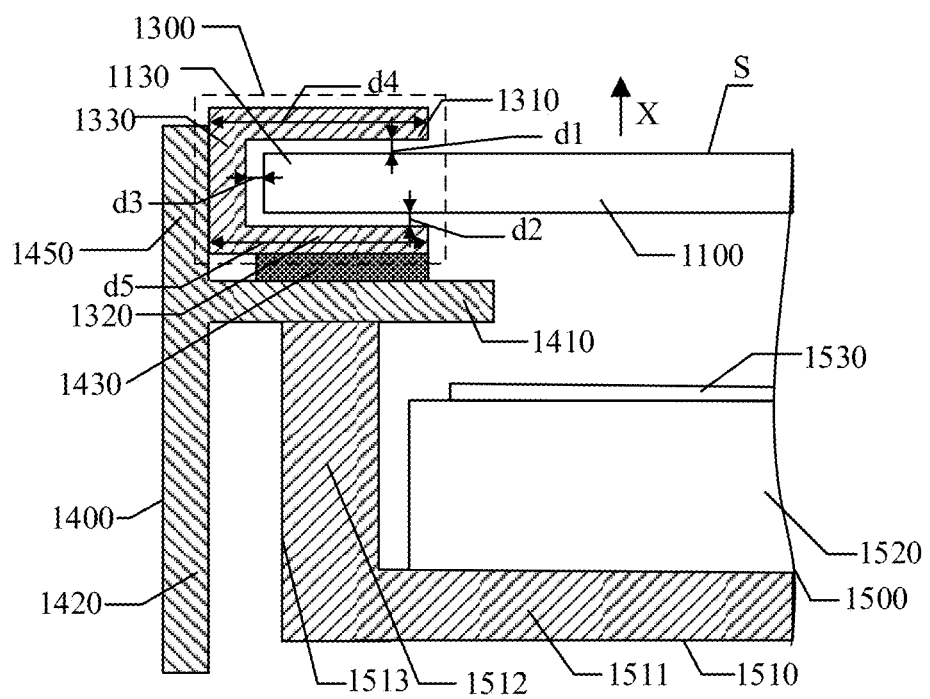
FIG. 8 is a schematic cross-sectional view of the liquid crystal module illustrated in FIG. 1 taken along the line A2-B2 provided by still another embodiment of the present disclosure.

For example, in some examples, as illustrated in FIG. 8, the second frame 1400 further includes a sixth frame body 1450. The sixth frame body 1450 extends from the fifth frame body 1420 along a direction close to the first frame 1300, that is, along the X direction perpendicular to the plate surface S of the liquid crystal panel 1100. The sixth frame body 1450 is integrally formed with the fifth frame body 1420. The sixth frame body 1450 and the third frame body 1330 are parallel in the X direction perpendicular to the plate surface S of the liquid crystal panel 1100. A surface of the sixth frame body 1450 facing the third frame body 1330 is opposite to a surface of the third frame body 1330 away from the liquid crystal panel 1100. An end surface of the sixth frame body 1450 is not flush with a surface of the first frame body 1310 away from the liquid crystal panel 1100. The second frame 1400 can provide support for the first frame 1300.

For example, in some examples, the end surface of the sixth frame body 1450 may be flush with the surface of the first frame body 1310 away from the liquid crystal panel 1100, and the embodiments of the present disclosure are not limited thereto.

For example, in some examples, the fourth frame body 1410, the fifth frame body 1420, and the sixth frame body 1450 of the second frame 1400 are manufactured by an integral forming method. The fourth frame body 1410, the fifth frame body 1420, and the sixth frame body 1450 may adopt other manufacturing processes to obtain the structure illustrated in FIG. 8, and the embodiments of the present disclosure are not limited thereto.

Figure 9:
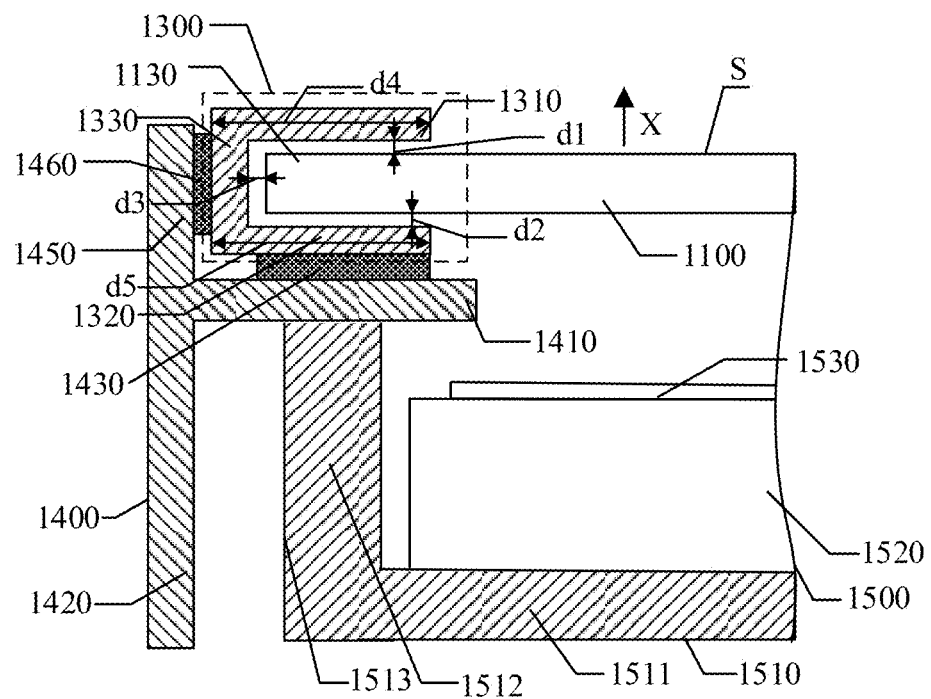
FIG. 9 is a schematic cross-sectional view of the liquid crystal module illustrated in FIG. 1 taken along the line A2-B2 provided by still another embodiment of the present disclosure.

In the liquid crystal module provided by at least one embodiment of the present disclosure, as illustrated in FIG. 9, the surface of the sixth frame body 1450 facing the third frame body 1330 is connected with a surface of the third frame body 1330 facing the sixth frame body 1450 through a second adhesive layer 1460. For example, the second adhesive layer 1460 may be a double-sided adhesive tape. The sixth frame body 1450 is fixed to the third frame body 1330 by the second adhesive layer 1460, which improves the stable support between the first frame body 1310 and the second frame body 1320.

For example, in some examples, as illustrated in FIG. 1, the first edge 1110 of the liquid crystal panel 1100 is provided with a bonding region 1150, and the bonding region 1150 is configured to be bonded with a circuit board or a chip.

Figure 10:
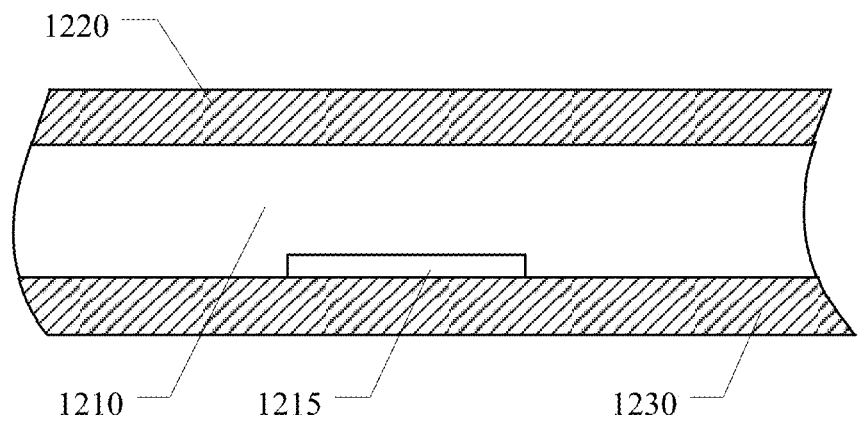
FIG. 10 is a partial schematic diagram of a bottom frame of a liquid crystal module provided by an embodiment of the present disclosure.

FIG. 10 is a partial schematic diagram of the bottom frame of the liquid crystal module provided by an embodiment of the present disclosure. As illustrated in FIG. 10, the first bottom plate 1210 of the bottom frame 1200 is provided with an opening 1215, a flexible printed circuit (FPC) may be connected to the bonding region 1150 through the opening 1215 on the first edge 1110 of the liquid crystal panel 1100.

For example, in some examples, a material of the first frame 1300 may include polymeric materials such as polystyrene plastics, polyethylene, polycarbonate, acrylonitrile butadiene styrene, etc. In addition, some surface treatment processes are performed on the surface of the first frame 1300, so that the appearance and color of the first frame 1300 look the same as the black color of the liquid crystal panel, which makes the appearance of the liquid crystal module more beautiful.

At least one embodiment of the present disclosure provides a display device, which includes the liquid crystal module described in any one of the above embodiments.

According to the liquid crystal module and the display device provided by the embodiment of the disclosure, the first edge of the liquid crystal panel is arranged in the bottom frame, and at least one selected from the group consisting of the second edge, the third edge and the fourth edge of the liquid crystal panel is arranged in the first frame, because the liquid crystal panel of the liquid crystal module is movably arranged in the open region of the first frame, and a space for movement is arranged between the first frame and the liquid crystal panel, so that the effect of external forces on the liquid crystal panel is reduced, deformation caused by being squeezed is avoided, and the dark state light leakage phenomenon of the liquid crystal panel can be further reduced.

In some examples, the display device includes a television. The television is, for example, a liquid crystal television. Embodiments of the present disclosure are not limited thereto. The display device may also be other electronic devices with display functions such as computers, notebook computers and tablet computers.

The following points need to be noted:

(1) The accompanying drawings involve only the structure(s) in connection with the embodiment(s) of the present disclosure, and other structure(s) can be referred to common design(s).

(2) In case of no conflict, embodiments of the present disclosure and the features in the embodiments may be mutually combined to obtain new embodiments.

The above descriptions are only the specific implementations of the present disclosure, but the protection scope of the present disclosure is not limited to this. Any changes or substitutions that can be easily thought of by those skilled in the art within the technical scope disclosed in the present disclosure should be covered by the protection scope of the present disclosure. Therefore, the protection scope of the present disclosure should be based on the protection scope of the claims.

What is claimed is:

1. A liquid crystal module, comprising:
a liquid crystal panel comprising a plate surface, a first edge, a second edge opposite to the first edge, a third edge and a fourth edge, wherein the third edge and the fourth edge are connected with the first edge and the second edge and are opposite to each other;
a bottom frame comprising a bottom plate, a first side plate and a second side plate, wherein the first side plate and the second side plate are opposite at an interval and respective at two opposite edges of the bottom plate, and the first edge of the liquid crystal panel is in an open region surrounded by the bottom plate, the first side plate and the second side plate; and
a first frame on at least one selected from a group consisting of the second edge, the third edge and the fourth edge of the liquid crystal panel,
wherein the first frame comprises:
a first frame body,
a second frame body parallel to the first frame body, and
a third frame body, wherein the third frame connects an end of the first frame body away from a center of the liquid crystal panel and an end of the second frame body away from the center of the liquid crystal panel, at least one selected from the group consisting of the second edge, third edge and fourth edge of the liquid crystal panel is in an open region surrounded by the first frame body, the second frame body and the third frame body, and in a direction perpendicular to the plate surface of the liquid crystal panel, the first frame and the liquid crystal panel are movably arranged with respect to each other;
wherein the liquid crystal module further comprises:
a second frame connected with a surface of the second frame body away from the liquid crystal panel in the direction perpendicular to the plate surface of the liquid crystal panel,
wherein the second frame comprises:
a fourth frame body;
a first adhesive layer on a surface of the fourth frame body facing the second frame body; and
a fifth frame body connected with an end of the fourth frame body away from the center of the liquid crystal panel, wherein a surface of the second frame body away from the liquid crystal panel is connected with a surface of the fourth frame facing the second frame body through the first adhesive layer.

2. The liquid crystal module according to claim 1, wherein in the direction perpendicular to the plate surface of the liquid crystal panel, the first frame body and the liquid crystal panel are opposite and arranged at a first interval,
in the direction perpendicular to the plate surface of the liquid crystal panel, the second frame body and the liquid crystal panel are opposite and arranged at a second interval,
the first interval comprises at least one selected from a group consisting of air and a first buffer layer, and the second interval comprises at least one selected from a group consisting of air and a second buffer layer.

3. The liquid crystal module according to claim 2, wherein the first buffer layer is configured to be elastically compressible in the direction perpendicular to the plate surface of the liquid crystal panel, and an elastic modulus of the first buffer layer is greater than 30 Mpa and less than 100 Mpa; and
the second buffer layer is configured to be elastically compressible in the direction perpendicular to the plate surface of the liquid crystal panel, and an elastic modulus of the second buffer layer is greater than 30 Mpa and less than 100 Mpa.

4. The liquid crystal module according to claim 2, wherein the first buffer layer comprises a first compressible foam or a first single-sided adhesive tape,
the second buffer layer comprises a second compressible foam or a second single-sided adhesive tape,
an adhesive surface of the first single-sided adhesive tape is at a side of the first single-sided adhesive tape away from the liquid crystal panel, and an adhesive surface of the second single-sided adhesive tape is at a side of the second single-sided adhesive tape away from the liquid crystal panel.

5. The liquid crystal module according to claim 2, wherein a ratio of a size of the first interval in the direction perpendicular to the plate surface of the liquid crystal panel to a thickness of the liquid crystal panel ranges from 10% to 20%, and a ratio of a size of the second interval in the direction perpendicular to the plate surface of the liquid crystal panel to the thickness of the liquid crystal panel ranges from 10% to 20%.

6. The liquid crystal module according to claim 1, wherein the first frame is on the second edge, the third edge and the fourth edge of the liquid crystal panel, and a part of the first frame corresponding to the third edge and a part of the first frame corresponding to the fourth edge are respective at two ends of the bottom frame to constitute a rectangular frame, and the liquid crystal panel is in the rectangular frame.

7. The liquid crystal module according to claim 1, wherein in the direction perpendicular to the plate surface of the liquid crystal panel, the first side plate and the liquid crystal panel are opposite and arranged at a third interval,
in the direction perpendicular to the plate surface of the liquid crystal panel, the second side plate and the liquid crystal panel are opposite and arranged at a fourth interval,
the third interval comprises at least one selected from a group consisting of air and a third buffer layer, and the fourth interval comprises at least one selected from a group consisting of air and a fourth buffer layer.

8. The liquid crystal module according to claim 7, wherein the third buffer layer is configured to be elastically compressible in the direction perpendicular to the plate surface of the liquid crystal panel, and an elastic modulus of the third buffer layer is greater than 30 Mpa and less than 100 Mpa; and
the fourth buffer layer is configured to be elastically compressible in the direction perpendicular to the plate surface of the liquid crystal panel, and an elastic modulus of the fourth buffer layer is greater than 30 Mpa and less than 100 Mpa.

9. The liquid crystal module according to claim 7, wherein the third buffer layer comprises a third compressible foam or a third single-sided adhesive tape,
the fourth buffer layer comprises a fourth compressible foam or a fourth single-sided adhesive tape,
an adhesive surface of the third single-sided adhesive tape is at a side of the third single-sided adhesive tape away from the liquid crystal panel, and an adhesive surface of the fourth single-sided adhesive tape is at a side of the fourth single-sided adhesive tape away from the liquid crystal panel.

10. The liquid crystal module according to claim 1, wherein a size of the first frame body in a direction perpendicular to the third frame body ranges from 2 mm to 3 mm,
a size of the second frame body in the direction perpendicular to the third frame body ranges from 2 mm to 3 mm.

11. The liquid crystal module according to claim 10, wherein the first frame and the second frame have a same size in the direction perpendicular to the third frame body.

12. The liquid crystal module according to claim 1, wherein a fifth interval is between the third frame body and at least one selected from the group consisting of the second edge, the third edge and the fourth edge of the liquid crystal panel, and the fifth interval comprises at least one selected from a group consisting of air and a fifth buffer layer.

13. The liquid crystal module according to claim 12, wherein the fifth buffer layer is configured to be elastically compressible in the direction perpendicular to the plate surface of the liquid crystal panel, and an elastic modulus of the fifth buffer layer is greater than 30 Mpa and less than 100 Mpa.

14. The liquid crystal module according to claim 1, wherein the first edge of the liquid crystal panel is provided with a bonding region, and the bonding region is configured to be bonded with a circuit board or a chip.

15. The liquid crystal module according to claim 1, wherein an outer side of the third frame body away from the center of the liquid crystal panel is flush with an outer side of the fifth frame body away from the center of the liquid crystal panel, and the second frame further comprises a first protrusion portion on the surface of the fourth frame facing the second frame body;
   an orthographic projection of the first protrusion portion on a plane where the plate surface of the liquid crystal panel is located overlaps with an orthographic projection of the second frame body on the plane where the plate surface of the liquid crystal panel is located,
   an end surface of the first protrusion portion close to the second frame body is basically flush with a surface of the first adhesive layer close to the second frame body, and
   the first protrusion portion is at an outer side of the first adhesive layer away from the center of the liquid crystal panel.

16. The liquid crystal module according to claim 1, wherein the second frame further comprises a sixth frame body,
   the sixth frame body extends from the fifth frame along a direction close to the first frame,
   the sixth frame and the third frame are parallel in the direction perpendicular to the plate surface of the liquid crystal panel, and
   a surface of the sixth frame body facing the third frame body is connected with a surface of the third frame body facing the sixth frame body through a second adhesive layer.

17. The liquid crystal module according to claim 1, further comprising:
   a backlight assembly which is on a side of the second side plate away from the liquid crystal panel and on a side of the fourth frame body of the second frame away from the liquid crystal panel, and has an end surface opposite to the fifth frame body,
   wherein the backlight assembly comprises a light guide plate and a back plate, the light guide plate is parallel to the liquid crystal panel, and the back plate is at a side of the light guide plate away from the liquid crystal panel, the back plate comprises a plate-shaped body and an end portion, the plate-shaped body is parallel to the plate surface of the liquid crystal panel, and the end portion is perpendicular to the plate-shaped body and opposite to the end surface of the light guide plate.

18. A display device, comprising the liquid crystal module according to claim 1.

19. The display device according to claim 18, wherein the display device comprises a television.

* * * * *